US006826260B1

(12) United States Patent
Vincze et al.

(10) Patent No.: US 6,826,260 B1
(45) Date of Patent: Nov. 30, 2004

(54) METHOD AND APPARATUS FOR AN MLSC STATE MACHINE

(75) Inventors: Michael Vincze, Garland, TX (US); Robert Gammenthaler, Frisco, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/541,411

(22) Filed: Mar. 31, 2000

(51) Int. Cl.[7] .......................... H04M 1/24; H04M 3/08; H04M 3/22
(52) U.S. Cl. .......................... 379/15.02; 379/9; 379/14; 379/15.01; 379/230
(58) Field of Search ............ 379/32.01, 221.01–221.12, 379/229–230, 126, 133–134, 112.01, 9, 14, 15.01–15.02, 15.04, 32.03

(56) References Cited

U.S. PATENT DOCUMENTS 5,434,845 A * 7/1995 Miller ......................... 370/252
5,757,895 A * 5/1998 Aridas et al. ............... 379/136

\* cited by examiner

*Primary Examiner*—Duc Nguyen
(74) *Attorney, Agent, or Firm*—Craig A. Hoersten; V. Lawrence Sewell

(57) ABSTRACT

The present invention provides for a method and an apparatus that implements the Bell Communications Research (now Telcordia) Specification of Signaling System No. 7, chapter T1.111.3 algorithm requirements in hardware in a manner that significantly improves throughput capacity and reduces event processing time. The software driven implementations of the MTP-2 algorithms satisfy the requirements of T1.111.3, but only a limited number of communications channels may be processed therewith. The number of channels that may be processed by the present invention, however, is only constrained by the available logic resources and gate delays. In the described embodiment of the invention, 64 channels of data may be processed by the inventive gate array formed to execute the MTP-2 algorithm. To achieve such results, the MLSC inventive gate array includes circuitry that parses incoming signaling into three different groups. One group is passed along to a state logic state machine while another is passed to a tests state machine that performs tests in parallel on a given signal and passes the test results to the state logic state machine. A third group is passed to an operations module that performs operations in parallel based upon the input signaling to produce the results to the state logic state machine. The parallel processing thus supports fast signal processing.

16 Claims, 6 Drawing Sheets

METHOD AND APPARATUS FOR AN MLSC STATE MACHINE

BACKGROUND

1. Technical Field

The present invention related to telecommunication networks and, more particularly, to signal transfer point systems in an Advanced Intelligent Network.

2. Related Art

Developments with the telecommunication industry has significantly improved the ability for people to communicate, exchange data, perform research, and, more generally, the ability to access information resources that were unavailable even in recent history to the common person. The new communication networks are altering the business landscape and are altering the very way individuals work, shop, and keep in touch with each other. Not only, for example, can one use cellular phone service or e-mail to communicate with others, one can also now obtain large documents, graphic images, databases, and other types of information having significant memory footprints through wireless and wireline networks.

The manner in which the communication networks are evolving creates a need for more capable information access tools (computers and transceivers, for example). The new tools, in turn, create a need for new networks having increased data throughput capacity and reliability. New networks and information exchange capabilities that were unimaginable even in recent times are being developed and implemented in a way that impacts businesses and individuals in a significant way. For example, standalone computers may now be integrated with wireless radio telephones to allow the transmission of information from the computer to a destination by way of a wireless communication network and then by way of the Internet.

The recent explosion of the Internet is creating the capability and desire for networks of all types to be integrated and coupled to exchange data signals carrying the varying types of information. In many cases, the same data also will be transported through a local area network (LAN) and/or through a telecommunications network prior to being delivered to the Internet. Thus, by way of example, a digitized signal can be transported from a desktop computer through a telephone network to an Internet service provider and through the Internet to a final destination.

New international standards and protocols are being approved to make communication devices created by companies throughout the world compatible with each other. These protocols and standards are used to guide the design of the communication devices, and more specifically, to guide the design of the operating logic and software within the devices. While communication devices that are designed in view of these standards do not always follow the suggested models exactly, they are usually compatible with the protocol-defined interfaces (physical and logical). In order to appreciate the construction and operation of many devices, it is important to generally understand the concepts of some of the significant protocol standards and models.

One important model that currently guides development efforts is the International Standards Organization (ISO) Open Systems Interconnection (OSI) model. ISO/OSI provides a network framework or model that allows equipment from different vendors to communicate with each other. The OSI model organizes the communication process into seven different categories or layers and places these layers in a sequence based on their relation to the user. Layers 1 through 3 provide actual network access and control. Layers 4 through 7 relate to the point to point communications between the message source and destination.

More specifically, the seven layers in the OSI model work together to transfer communication signals through a network. Layer 1 includes the physical layer meaning the actual hardware that transmits currents having a voltage representing a bit of information. Layer 1 also provides for the functional and procedural characteristics of the hardware to activate, maintain, and deactivate physical data links that transparently pass the bit stream for communication between data link entities. Layer 2 is the data link layer or the technology specific transfer layer that effectuates and controls the actual transmissions between network entities. For example, layer 2 provides for activation, maintenance, and deactivation of data link connections, character and frame synchronization, grouping of bits into characters and frames, error control, media access control and flow control.

Layer 3 is the network layer at which routing, switching and delaying decisions are made to create a path through a network. Such decisions are made in view of the network as a whole and of the available communication paths through the network. For example, decisions as to which nodes should be used to create a signal path are decided at layer 3. As may be seen, layers 1, 2 and 3 control the physical aspects of data transmission.

While the first three layers control the physical aspects of data transmission, the remaining layers relate more to communication functionality. To illustrate, layer 4 is the transport layer that defines the rules for information exchange and manages the point to point delivery of information within and between networks including providing error recovery and flow control. Layer 5 is the session layer that controls the basic communications that occur at layer 4. Layer 6 is the presentation layer that serves as a gateway (a type of "software" interface) between protocols and syntax of dissimilar systems. Layer 7 is the application layer that includes higher level functions for particular application services. Examples of layer 7 functions include file transfer, creation of virtual terminals, and remote file access.

Each of the above defined layers are as defined by the OSI model. While specific implementations often vary from what is defined above, the general principles are followed so that dissimilar devices may communicate with each other.

With respect to the telephony networks, and especially in Signaling System No. 7 (SS7) network layer 1 is frequently referred to as message transfer part layer 1 (MTP 1) while layer 2 is MTP 2 and layer 3 is MTP 3. Layer 4 is often referred to as the signal connection control part (SCCP) while layer 5 is the Transaction Capabilities Application Part (TCAP). Layer 6 is the Operation, Maintenance and Administration layer (OMAP). With the continuing increase in demand for transporting data, telecommunication systems are being pushed to be increasingly efficient and to handle larger amounts of data. What is needed, therefore, is a method and apparatus that includes the conventional design approaches and that is capable of providing increasingly greater amounts of data throughput.

SUMMARY OF THE INVENTION

The present invention provides for a method and an apparatus that implements the Bell Communications Research specification of Signaling System No.7, chapter T1.111.3 MTP-2 algorithm requirements in hardware. By implementing the algorithm in hardware to provide parallel processing on input parameters and start up data, throughput capacity is significantly improved, and processing time is reduced. The software driven implementations of the MTP-2 algorithms that satisfy the requirements of ANSI T1.111.3, are capable of processing a limited number of communications channels. The number of channels that may be processed by the present invention, however, is greatly improved. In the described embodiment of the invention, 64 channels of data may be processed by a field programmable gate array (gate array) that implements the MTP-2 Link State Controller (MLSC) message transfer part (MTP-2) algorithm.

To achieve such results, the MLSC gate array includes circuitry that parses incoming signaling into three different groups. One group is transmitted to a state logic state machine, while another is transmitted to a test module state machine that performs tests on a given signal and passes the test results to the state logic state machine, and third group is transmitted to an operations module that performs logical mathematical operations based upon the input signaling to produce the results to the state logic state machine. Accordingly, the parallel processing occurs in the MLSC gate array that supports very fast signal processing. The number of communication channels that may be processed by one system is greatly increased.

DETAILED DESCRIPTION OF THE DRAWINGS

Figure 1:
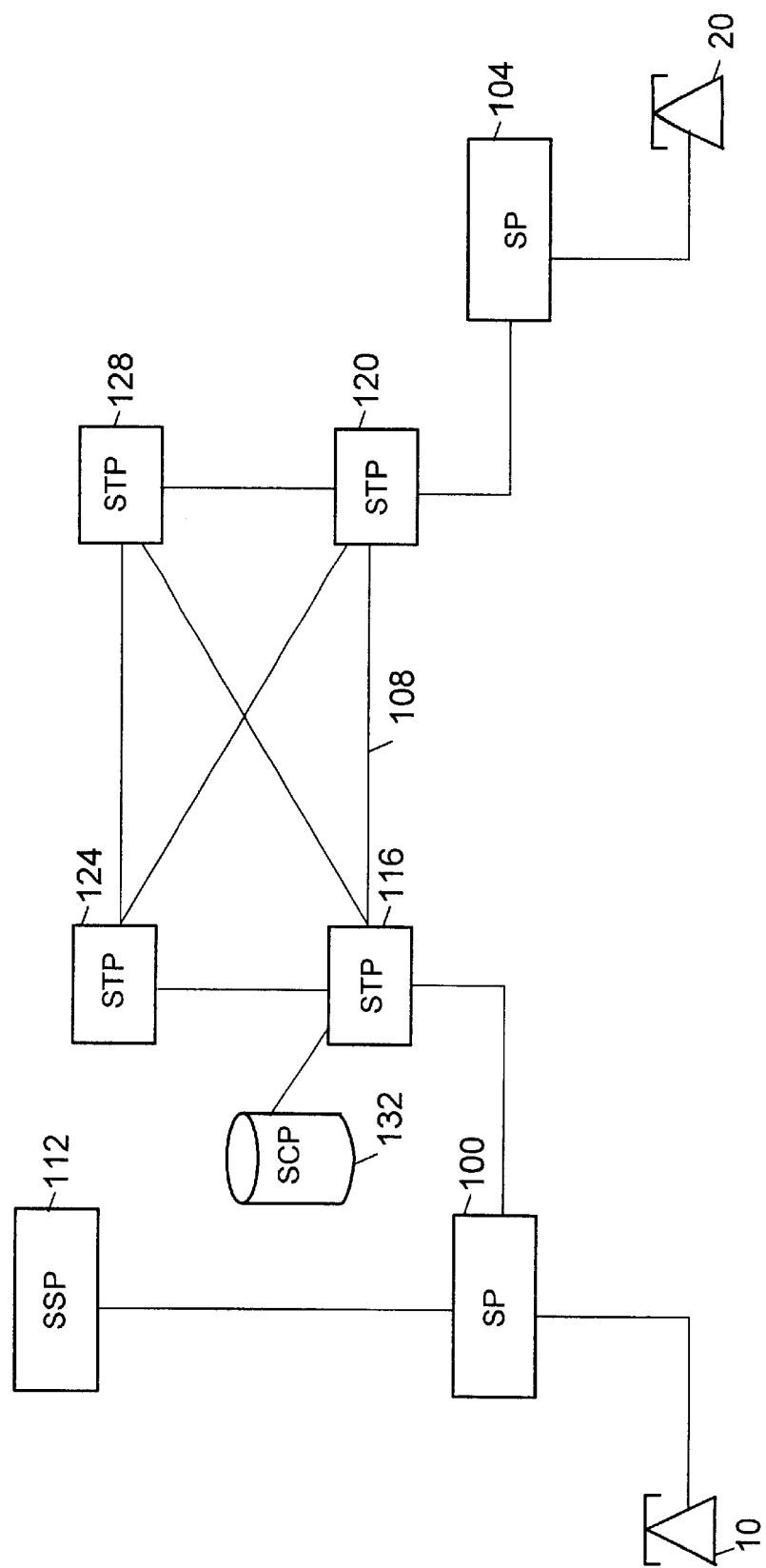
FIG. 1 is a functional block diagram of an SS7 telecommunication network that includes an MLSC state machine according to one embodiment of the present invention.

FIG. 1 is a functional block diagram of an SS7 telecommunication network that includes an MLSC state machine according to one embodiment of the present invention. Referring now to FIG. 1, a telephone 10 is coupled to a Signaling Point (SP) 100 that is for creating the connection to a destination SP 104. The destination SP 104, in turn, connects the call to called party phone 20. SP 100 and SP 104 are coupled directly by a trunk 108. Trunk 108 is a line that physically couples and carries conversations and data from SP to SP. It should be understood, of course, that a communication link may comprise three or more SPs wherein a plurality of trunks would be used to create a communication link from calling party phone 10 to called party phone 20. SP 100 is also coupled to a Service Switching Point (SSP) 112 and to a Signal Transfer Point (STP) 116. STP 116, in turn, is coupled to STP 120 as well as STPs 124 and 128. Additionally, STP 116 is coupled to a Service Control Point (SCP 132). An SSP is a SP that runs SS7 Transaction Capabilities Application Part (TCAP). It is capable of supporting Service Central Point (SCP) database operations, halting call progress and other operations. It can run in end offices, tandems, or access tandems. The STP runs the SS7's Message Transfer Part (MTP) and the Signaling Connection Control Part (SCCP). The STP only interfaces with SS7 links and does not interface with voice or data links. The SCP is also a SP that provides data base support operations to another SCP or SSP.

In operation, when calling party 10 dials the digits to place a call to called party 20, the SP 100 communicates with STP 116 which in turn communicates with SCP 132 to obtain routing information for the call. Thus STP 116 returns the specific control and routing information to SP 100 to direct it to establish a connection to SP 104 over trunk 108. Without the query to the SCP 132 by way of STP 116, SP 100 cannot know that called party is physically coupled to SP 104. Thus the query is necessary to determine what trunk line should be selected for routing the call. The signaling messages that are routed and performed by STP 116 are, therefore, a critically important part of setting up a call. Accordingly, as may be seen, STP 116 also is coupled to STPs 124, 128, and 120. The network of STPs enables alternate signal message routing in the event of a failure of a communication link. Accordingly, SP 100 is able to obtain the information that it needs to set up the call even if a signaling link failure occurs along the path between SP 100 and SCP 132.

With respect to STP 116, the examples herein illustrate the process steps for setting up a call. The MTP-2 signaling control is performed in part by a module within STP 116 that implements Bell Communication Research specification of Signaling System No. 7 Chapter T1.111 which describes the functional requirements for the message transfer part. In existing systems, the MTP-2 Link State Control (MLSC) is performed by a processor that executes stored computer instructions for performing the processing of the signaling messages. The inventors herein have realized, however, that the traditional designs for implementing the requirements of chapter T1.111 of the Bellcore specification for SS7 may only process a limited number of signaling messages for a limited number of communication channels. Accordingly, the inventors have developed a field programmable gate array circuit that implements the logic of the MLSC. Thus, the network of FIG. 1 includes an STP 116 that itself includes an MLSC gate array that performs the state machine functions for the MTP-2. The MLSC gate array of FIG. 1 includes state machines, timers, and counters defined in T1.111.3 and also performs traffic metering and measurement reporting. By implementing the algorithm defined in chapter T1.111 in a field programmable gate array design, a much greater number of channels may be processed. In prior art systems, the capacity of the system has been limited by a processor's capacity to respond to events in a specified manner, with the present invention, however, the capacity is the logic resources and gate delays. In the described embodiment, a system has been developed that allows for the processing for 64 MTP-2 channels. In contrast, present software driven systems may only process a much lower number of channels, for example, four channels.

Figure 2:
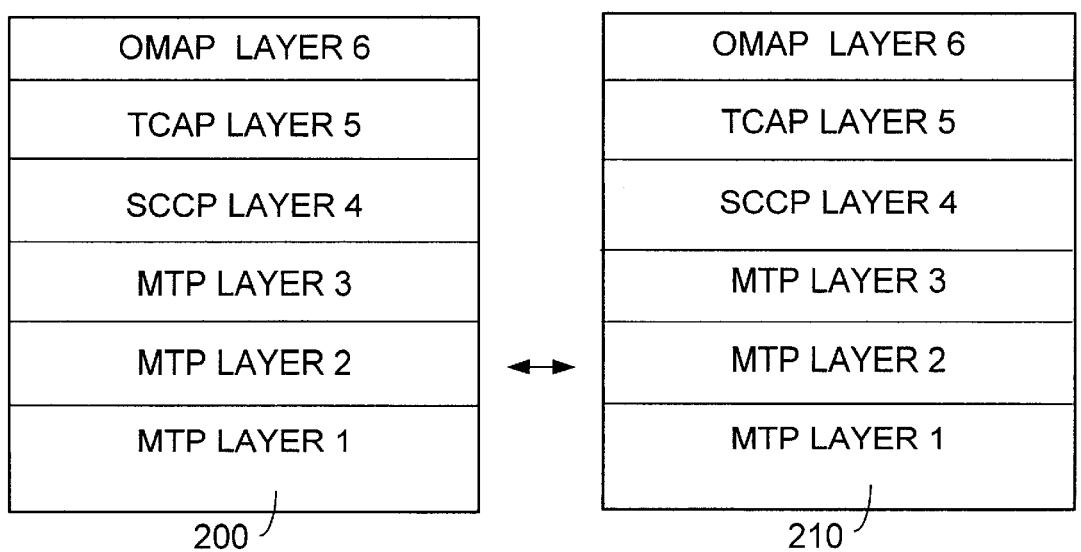
FIG. 2 is a functional block diagram that illustrates the protocol stack that includes six layers of a system hardware device for the network of FIG. 1.

FIG. 2 is a functional block diagram that illustrates the protocol layers of a system hardware device for the network of FIG. 1 that includes six layers. Namely, it includes three MTP layers, one SCCP layer, a TCAP layer, and an OMAP layer. In particular, FIG. 2 illustrates that the signaling messages occur at the MTP-2 layer. The MTP-1 layer is a full duplex transmission channel layer. The MTP-2 layer is the layer at which all signaling messages from layers 3 and above are transmitted. In other words, the MTP-2 layer is the layer that generates the control signaling for transmitting all of the layer 3 and above signaling messages.

The present invention then includes a field programmable gate array system that controls the routing and transmission of the layer 3 and above signaling messages.

Figure 3:
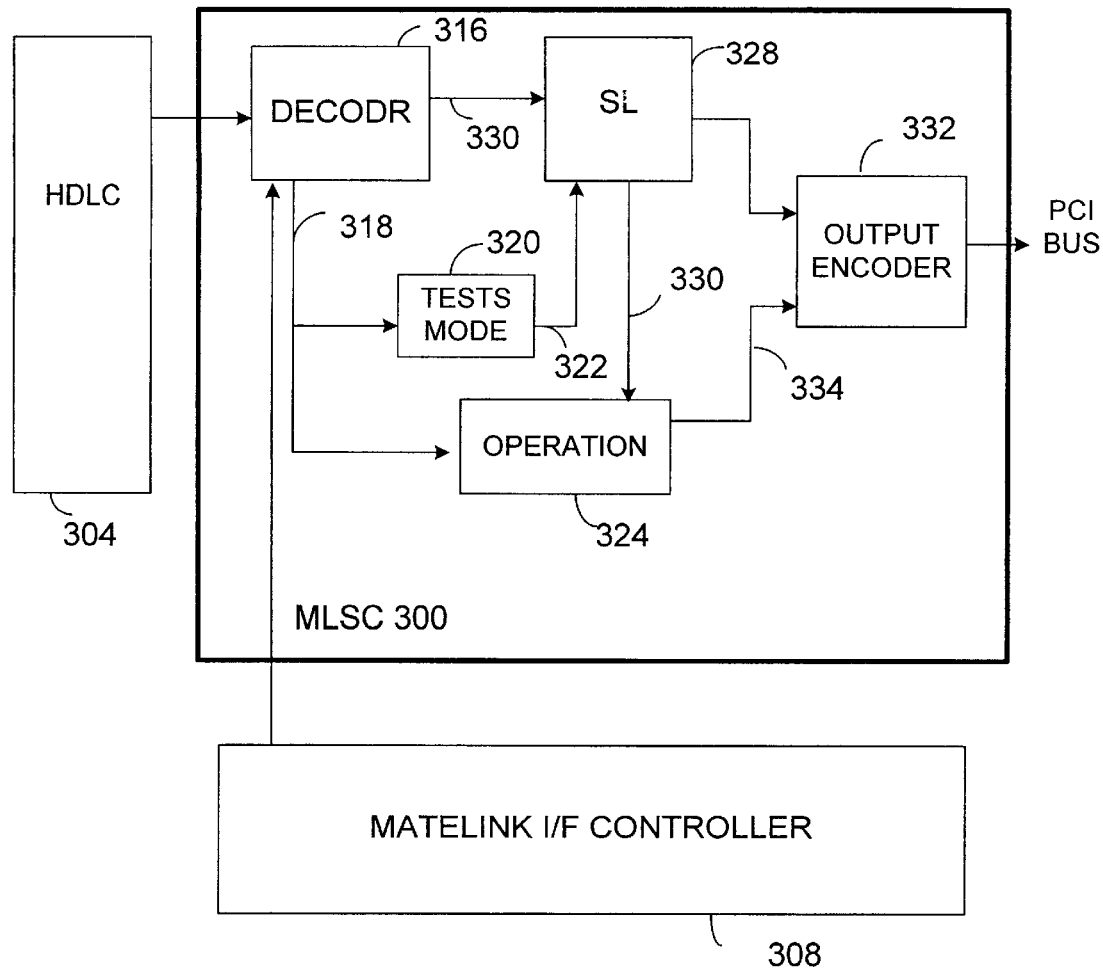
FIG. 3 is a functional block diagram of an MTP-2 signaling link processing system including the inventive MLSC.

FIG. 3 is a functional block diagram of an MTP-2 signaling link processing system including the inventive MLSC. An MLSC 300 is communicatively coupled to a signal unit generation and detection device that performs the physical layer support functions for a communication card and also performs timing functions for the MTP-2. The Matelink I/F Controller 308 provides communication paths between redundant MTP-2 signaling link application nodes for synchronizing various processes. The Matelink provides MTP-2 current state and sequence number synchronization, switch over control, and active/standby interlock among other types of information and support.

MLSC 300 comprises a decoder 316, a test module 320 for performing logical tests, and an operations module 324 for performing logical operations such as additions and subtractions. Additionally, MLSC 300 includes a state logic controller 328 and an output controller 332.

Decoder 316 is coupled to provide outputs to test module 320 and operation module 324 and to provide a separate set of outputs to state logic controller 328. State logic controller 328 further provides outputs to operation module 324 as well as to output decoder 332. Test module 320 provides its outputs to state logic controller 328 while operation module 324 provides its outputs to output encoder 332. Output encoder 332 combines outputs from the operation module 324 and the state logic controller 328 to provide the outputs for the MLSC 300.

In operation, an input signal received by decoder 316 has separated from it those signals that require either a mathematical operation or a logical test and which are transmitted out from decoder 316 on line 318 where they are received by test module 320 and operations module 324. Those signals that may merely be used as input parameters in the state logic of state logic controller 328 are transmitted to state logic controller 328 over line 330. As may be seen, test module 320 provides its outputs on line 322 to state logic controller 328. Accordingly, the results of the test module 320 may be used as a parameter in the internal logic executed by state logic controller 328. If the state logic controller 328 determines that a mathematical operation needs to be executed, it provides a parameter to operations module 324 by way of line 330. Operations module 324 then produces the results of its operation to output decoder 332 over line 334. Output decoder 332 combines the signals received from state logic controller 328 or operations module 324 to encode and blend received signals to create the output for the MLSC state machine 300.

One advantage of the MLSC state machine 300 is that the state logic controller 328, the test module 320, and the operations module 324 all operate approximately in parallel, meaning that data may be processed at a much faster rate. Additionally, because the system is implemented in hardware, the execution of given logical operations happen at a much greater speed. Accordingly, an MLSC state machine as shown in FIG. 3 is operable to process the signaling for a significantly greater number of communication links.

Figure 4:
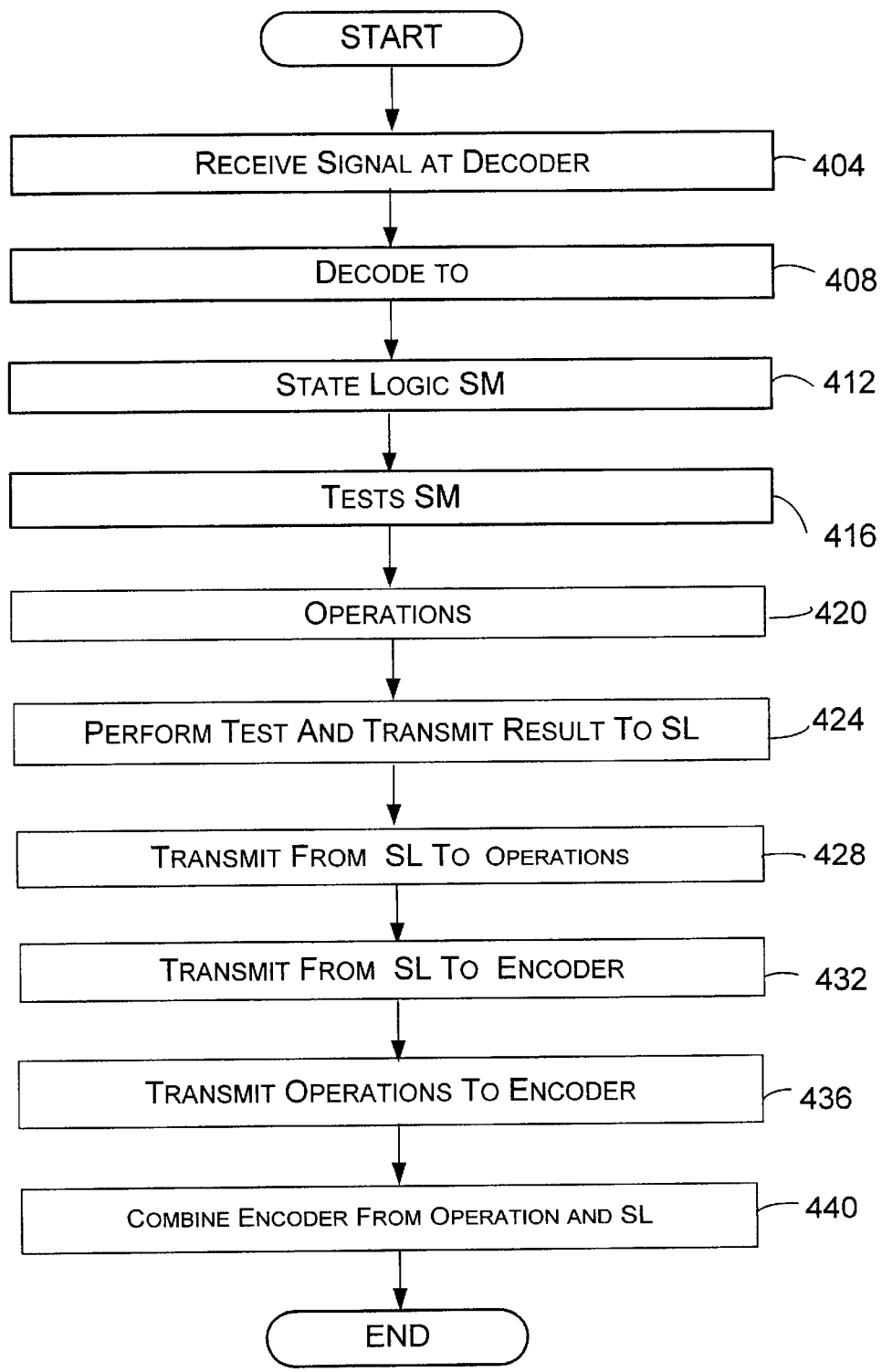
FIG. 4 is a flow chart illustrating a method for performing ANSI state machine functions for the MTP-2. algorithm according to one embodiment of the described invention.

FIG. 4 is a flow chart illustrating a method for performing ANSI state machine functions for MTP-2 according to one embodiment of the described invention. First, a signal is received at a decoder of an MLSC state machine (step 404). The signal may be one of any of the many signals that are defined in T1.111.3 of the Bell Communications Research Specification of Signaling System No. 7 functional description of the message transfer part. The received signal is then decoded and sent to one of a plurality of different modules within the MLSC state machine (step 408) For example, some signals will be transmitted straight through to the state logic module (step 412) while other signals will be transmitted both to the test module (step 416) and operation module (step 420). For those signals that are transmitted to the test module, a mathematical test is performed and a result is transmitted from the test module to the state logic module (step 424).

Those signals that are received by the operations modules, a specified mathematical operation is performed for the signal, and then it is transmitted to the encoder for output from the system (step 428). With respect to the signals that are received by the state logic module from the decoder, according to the signal type, some will be processed by the state logic module and the result will be output to the operations module (step 432) while others for resulting signals will be transmitted directly to the encoder for output from the MLSC state machine (step 436). Thus, as may be seen, the encoder receives the input signal from the state logic machine and from the operations state machine to produce a coded output signal for the MLSC state machine (step 440).

Figure 5:
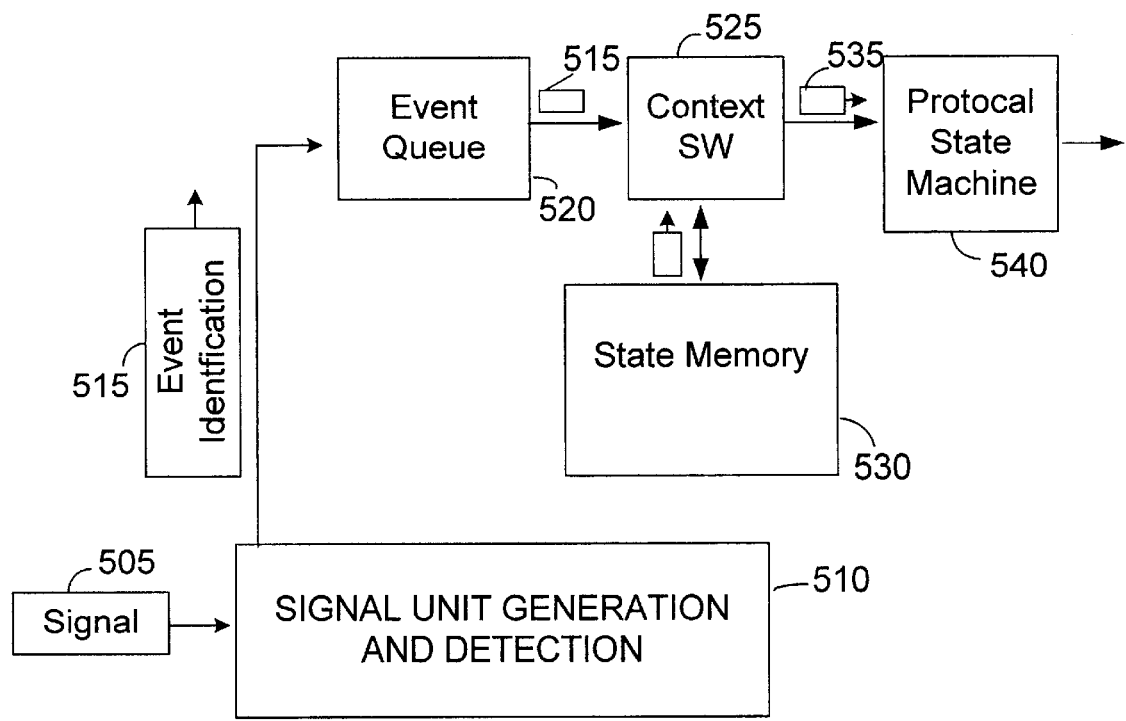
FIG. 5 is a functional block diagram of a protocol state machine gate array in communication with supporting circuitry for executing a defined algorithm according to one embodiment of the present invention.

FIG. 5 is a functional block diagram of a protocol state machine gate array in communication with supporting circuitry for executing a defined algorithm according to one embodiment of the present invention. Referring now to FIG. 5, a signal 505 is initially received by a signal unit generation and detection block 510. Upon receiving signal 505, signal unit generation and detection block 510 generates an event identification signal 515 and transmits it to an event queue 520. Event queue 520, as its names indicates, is a store that builds a queue of received event identification signals 515. The event queue 520 then generates one event identification at a time to a context switch 525. Context switch 525, upon receiving the event identification signal 515, obtains correspondence state information from a state memory 530. Thus, as may be seen, state memory 530 transmits corresponding state information to context switch 525 which corresponding state information relates to the event identification signal 515. Upon receiving the corresponding state information, context switch 525 transmits the corresponding state information obtained from state memory 530 to the protocol state machine 540. The protocol state machine then receives the corresponding state information obtained from state memory 530 and the event identification information 515 in a new signal 535. The protocol state machine 540 then produces a defined result according to its gate array design responsive to the new signal 535. In general, the network of FIG. 5 is to illustrate the type of processing that occurs external to the protocol state machine 540. The operation of the protocol state machine 540 is as described h in this application with respect to the other FIGS. and accompanying text. New signal 535 is the input signal received by, for example, decoder 316 of FIG. 3.

Figure 6:
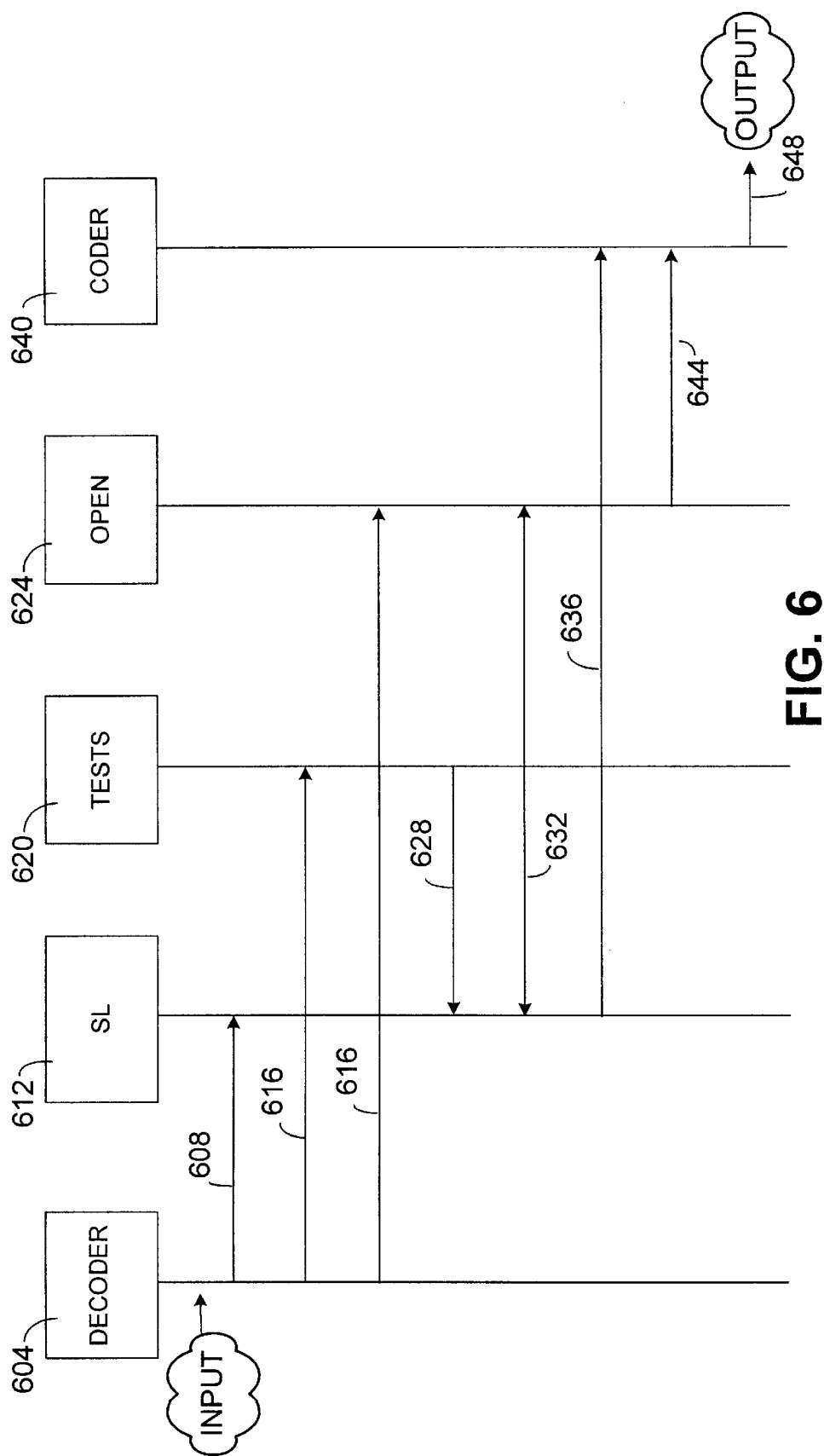
FIG. 6 is a signal sequence diagram illustrating the operation of an MLSC gate array according to one embodiment of the present invention.

FIG. 6 is a signal sequence diagram illustrating the operation of an MLSC gate array according to one embodiment of the present invention. As may be seen, an input signal is received by a decoder 604. Input decoder 604 then transmits signals 608 to state logic device 612 or it transmits signals 616 to test circuitry 620 and operations circuitry 624. Test circuitry 620, upon receiving signal 616, performs a test operation and transmits the results 628 to state logic device 612. State logic device, from receiving signal 608 and from receiving signal 628, transmits corresponding signals that result therefrom according to its internal logic operations in a state logic signal 632 to operations circuitry 624. Alternatively, or additionally, it transmits an output signal 636 to coder 640. Additionally, operations circuitry 624 transmits the output of its logical operations to coder 640 in an operations output signal 644. Coder 640 combines and codes the outputs to produce a signal 648, which is the output of the MLSC state machine.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. An MTP-2 Link State Control (MLSC) circuit for performing MTP-2 processing in a signaling system of a telecommunications network, comprising:

state machine transition circuitry for implementing state machine MTP-2 transition logic;

test circuitry for performing tests on input event operands and previous state data, and coupled to provide test and state results to the state machine transition circuitry;

operations circuitry for performing operations to produce next state data and output event operands, and coupled to receive operation control signals from the state machine transition circuitry;

decoder circuitry for parsing out an input signal stream to state machine transition circuitry, to the test circuitry, and to the operations circuitry; and an output encoder for receiving signals from the state machine transition circuitry and the operations circuitry for producing a coded MTP-2 output.

2. MLSC circuit of claim 1 wherein the state machine transition circuitry, the test circuitry and operations circuitry perform processing at least partially in parallel.

3. The MLSC circuit of clam 1 wherein the state machine transition circuitry as well as the test and operations circuitry are for handling tests, operations, state logic, and timers for a plurality of communication channels.

4. The MLSC circuit of claim 1 wherein the signaling system a signal transfer point in an SS7 telecommunications network.

5. The MLSC circuit of claim 1 wherein the decoder circuitry is Operable to parse out an input signal stream to one of a plurality of different circuits including the state machine transition circuitry, the test circuitry, and the operations circuitry according to signal type.

6. A gate array system for process signals received at an input, thereof in a signaling system of a telecommunications network the gate array system for providing a specified output that is a function of the received input signal, the gate array comprising:

a signal unit generation and detection block for receiving the input signal and identifying it;

an event queue for receiving event identification signals from the signal unit generation and detection block, the event queue for creating a queue of event identification signals;

a state memory for storing state information for each type of event identification signal stored within the event cue;

a context switch coupled to receive the event identification signals from the event cue, and coupled to communicate with the state memory for obtaining corresponding state information for each event identification signal received; and a protocol state machine for receiving the corresponding state information for the event identification signals, the protocol state machine for producing a specified response according to the event identification signal and the corresponding state information.

7. The gate array of claim 6 further comprising, within the protocol state machine, test circuit for performing tests on input event operands and previous state data.

8. The protocol state machine of claim 7 further including operation circuitry for performing logical operations to produce next state data and output event operands.

9. The gate array of claim 6 wherein the protocol state machine further comprises state machine transition circuitry for implementing state machine transition logic.

10. The gate array of claim 6 wherein the protocol state machine further includes circuitry for loading relevant state context information.

11. The gate array of claim 6 wherein the protocol state machine further includes decode circuitry for parsing out an input signal stream to one of plurality of different circuits.

12. The gate array of claim 11 wherein the protocol state machine further includes an output encoder for receiving signals from the state logic circuitry and for producing a coded input.

13. The gate array of claim 12 wherein the entire system forms a signaling interface in a signal transfer point in an SS7 telecommunications network.

14. The gate array of claim 13 wherein the protocol state machine is formed to process an MTP-2 algorithm.

15. A circuit for processing signals received at an input thereof in a signaling system of a telecommunications network, the circuit providing a specified output that is a function of the received input signal, and the circuit comprising:

a signal unit generation and detection block for receiving the input signal and identifying it;

an event queue for receiving event identification signals from the signal unit generation and detection block, the event queue creating a queue of event identification signals;

a state memory for storing state information for each type of event identification signal stored within the event queue;

a context switch coupled to receive the event identification signals from the event queue, and coupled to communicate with the state memory for obtaining corresponding state information for each event identification signal received; and a protocol state machine for receiving from the context switch the corresponding state information for the event identification signals, the protocol state machine producing a specified response according to the event identification signal and the corresponding state information.

16. The circuit of claim 15, wherein the protocol state machine includes an MTP-2 Link State Control (MLSC) circuit for performing MTP-2 processing, comprising:

state machine transition circuitry for implementing state machine MTP-2 transition logic;

test circuitry for performing tests on input event operands and previous state data, and coupled to provide test and state results to the state machine transition circuitry, operations circuitry for performing operations to produce next state data and output event operands, and coupled to receive operation control signals from the state machine transition circuitry;

decoder circuitry for parsing out an input signal stream received in the protocol state machine, to the state machine transition circuitry, to the test circuitry, and to the operations circuitry; and an output encoder for receiving signals from the state machine transition circuitry and the operations circuitry for producing a coded MTP-2 output.

* * * * *